US009482342B2

(12) United States Patent
Steinberger

(10) Patent No.: US 9,482,342 B2
(45) Date of Patent: Nov. 1, 2016

(54) RADIALLY DEFLECTABLE PISTON BUSHINGS

(71) Applicant: Schaeffler Technologies AG & Co. KG, Herzogenaurach (DE)

(72) Inventor: Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 648 days.

(21) Appl. No.: 13/898,877

(22) Filed: May 21, 2013

(65) Prior Publication Data

US 2013/0319221 A1 Dec. 5, 2013

Related U.S. Application Data

(60) Provisional application No. 61/653,147, filed on May 30, 2012.

(51) Int. Cl.
*F16H 45/02* (2006.01)
*F16J 1/02* (2006.01)
*F16D 25/0635* (2006.01)

(52) U.S. Cl.
CPC ............. *F16J 1/02* (2013.01); *F16H 45/02* (2013.01); *F16D 25/0635* (2013.01); *F16D 2300/08* (2013.01); *F16H 2045/0205* (2013.01); *F16H 2045/0221* (2013.01); *F16H 2045/0278* (2013.01)

(58) Field of Classification Search
CPC ... F16J 1/02; F16H 45/02; F16H 2045/0221; F16H 2045/0205; F16H 2045/0278; F16D 2300/08; F16D 25/0635
USPC ................ 192/3.29, 85.44; 60/341
See application file for complete search history.

(56) References Cited

U.S. PATENT DOCUMENTS

| | | | |
|---|---|---|---|
| 7,513,346 B2* | 4/2009 | Degler | F16H 45/02 192/113.36 |
| 7,992,694 B2* | 8/2011 | Krause | F16J 15/164 192/3.29 |
| 2008/0289926 A1 | 11/2008 | Olenzek et al. | |
| 2009/0125202 A1* | 5/2009 | Swank | F16F 15/12353 701/68 |
| 2011/0005880 A1* | 1/2011 | Carrier | F16H 45/02 192/3.29 |

* cited by examiner

*Primary Examiner* — Nathaniel Wiehe
*Assistant Examiner* — Dustin T Nguyen
(74) *Attorney, Agent, or Firm* — Chester Paul Maliszewski

(57) ABSTRACT

A piston assembly, including: a piston for a clutch in a torque converter including: first and second radial surfaces; and a radially inner-most end connecting the first and second radial surfaces. The piston assembly includes a radially displaceable bushing assembly: arranged to engage an input shaft for a transmission and form a first seal against the input shaft; including a first radial wall disposed parallel to the first radial surface and forming a second seal against the first radial surface; and including a second wall facing the second radial surface. The bushing assembly is radially displaceable with respect to the piston while maintaining the first seal between the first radial wall and the first radial surface and the second seal between the bushing assembly and the input shaft.

19 Claims, 5 Drawing Sheets

RADIALLY DEFLECTABLE PISTON BUSHINGS

CROSS-REFERENCE TO RELATED APPLICATIONS

This application claims the benefit under 35 U.S.C. §119(e) of U.S. Provisional Patent Application No. 61/653,147 filed May 30, 2012, which application is incorporated herein by reference.

TECHNICAL FIELD

The present disclosure relates to a radially deflectable piston bushing, in particular, a piston bushing arranged to maintain an adaptable seal between the piston and an input shaft.

BACKGROUND

FIG. 4 is a partial cross-sectional view of prior art torque converter 200 with bushing 202 for piston 204. The torque converter includes torque converter clutch 206 with piston 204. The clutch is controllable, as is known in the art, to provide a torque path from cover 208 to output 210 engaged with input transmission shaft 212. The clutch is opened and closed by axially displacing piston 204 in response to fluid pressure in chambers 214 and 216. Typically, fluid pressure in the chambers is supplied by a pump in the transmission. In order to ensure proper function of the clutch, for example, to close the clutch with sufficient force to prevent unwanted slipping of the clutch, pressure in chamber 216 must be maintained at a sufficiently greater level than pressure in chamber 214. If the pressure in chamber 216 falls beyond a certain level, the pump must be operated to boost the pressure, increasing energy consumption for the transmission and reducing the efficiency associated with operation of the torque converter and transmission. One source for loss of pressure in chamber 216 is leakage from chamber 216 to chamber 214 via the interface of the bushing with the input shaft.

Typically, there is some degree of misalignment between cover 208, which is centered by flexplate 218, which in turn is centered by a crankshaft for an engine, and input shaft 212. Piston 204 is fixed to the cover by leaf spring 220 and thus, the centering action of the crankshaft is transferred to the piston. However, the piston also must interface with the input shaft, causing end 222 of the piston to be out of alignment with the shaft if the cover and shaft are misaligned. This misalignment can cause leakage between the two chambers.

It is known to fix a bushing, such as bushing 202, to the end of the piston to attempt to minimize leakage between pressure chambers for a clutch. Typically, the bushing is formed of aluminum or sheet steel coated with a friction reducing layer. The sealing function of the bushing is based on a small clearance between the bushing and the input shaft. The clearance however, needs to be large enough to allow for the misalignment, described above, between the cover and the input shaft. For torque converter 200, the clearance between the input shaft and the bushing depends on the alignment (or misalignment) between the piston (cover) and the input shaft. The alignment problem is exacerbated when the torque converter includes complex assemblies with a large stackup, which result in higher offsets, or tolerances, which require a large clearance between the input shaft and the piston/bushing. Since the bushing is fixed to the end of the piston, the bushing cannot adapt to the misalignment of the piston/bushing with respect to the input shaft, which increases the leakage past the interface of the bushing and the input shaft.

FIG. 5 is a partial cross-sectional view of prior art torque converter 300 with a groove and a seal 302 for piston 304. The torque converter includes torque converter clutch 306 with piston 304. The clutch is controllable, as is known in the art, to provide a torque path from cover 308 to output 310. The clutch is opened and closed by axially displacing piston 304 in response to fluid pressure in chambers 314 and 316. Typically, fluid pressure in the chambers is supplied by a pump in the transmission. In order to ensure proper function of the clutch, for example, to close the clutch with sufficient force to prevent unwanted slipping of the clutch, pressure in chamber 316 must be maintained at a sufficiently greater level than pressure in chamber 314. If the pressure in chamber 316 falls beyond a certain level, the pump must be operated to boost the pressure, increasing energy consumption for the transmission and reducing the efficiency associated with operation of the torque converter and transmission. One source for loss of pressure in chamber 316 is leakage from chamber 316 to chamber 314 via the interface of the bushing with the input shaft.

It is known use a seal, such as seal 302, to attempt to prevent this leakage. It is necessary to provide groove 318 in order to hold the seal in position. In general, it is not possible to directly engage the seal with the input shaft; therefore, an intermediate part such as hub 320 is provided between the seal and the input shaft. That is, the groove is formed in the hub. The configuration of FIG. 5 increases the size, cost, and complexity of torque converter 300 due to the addition of the hub. The seal is fixedly connected to the hub via the groove. Due to the resiliency of the seal, the seal can adapt to a limited degree to the misalignment of the piston/bushing with respect to the input shaft; however, the seal is essentially static with respect to the input shaft.

SUMMARY

According to aspects illustrated herein, there is provided a piston assembly, including: a piston for a clutch in a torque converter including: first and second radial surfaces; and a radially inner-most end connecting the first and second radial surfaces. The piston assembly includes a radially displaceable bushing assembly: arranged to engage an input shaft for a transmission and form a first seal against the input shaft; including a first radial wall disposed parallel to the first radial surface and forming a second seal against the first radial surface; and including a second wall facing the second radial surface. The bushing assembly is radially displaceable with respect to the piston while maintaining the first seal between the first radial wall and the first radial surface and the second seal between the bushing assembly and the input shaft.

According to aspects illustrated herein, there is provided a torque converter, including a piston with first and second radial surfaces; and a radially inner-most end connecting the first and second radial surfaces. The torque converter includes a radially displaceable bushing assembly: arranged to engage an input shaft for a transmission and form a first seal against the input shaft; including a first radial wall disposed parallel to the first radial surface and arranged to form a second seal against the first radial surface; and including a second wall facing the second radial surface. The bushing assembly is radially displaceable with respect to the piston while maintaining the first seal between the first radial wall and the first radial surface and the second seal between the bushing assembly and the input shaft.

According to aspects illustrated herein, there is provided a torque converter, including: a cover arranged to receive torque; an output arranged to transmit torque to an input shaft for a transmission; and a torque converter clutch including: an axially displaceable piston: arranged to open and close the torque converter clutch; with first and second radial surfaces; and with a radially inner-most end connecting the first and second radial surfaces. The clutch includes a bushing assembly including: a first bushing with a first radial wall; a second bushing with a second radial wall; and a resilient element disposed between the first radial wall and the first radial surface and urging the first radial wall in an axial direction away from the first radial surface such that the second radial wall contacts the second radial surface and forms a first seal against the second radial surface. The first and second bushings are fixedly connected to each other in a liquid-tight manner. One of the first or second bushings is arranged to contact the input shaft to form a second seal against the input shaft. When the bushing assembly radially displaces to compensate for the radial misalignment of the piston with respect to the input shaft, the first seal remains functional and the bushing assembly is arranged to maintain contact with the input shaft, about the full circumference of the input shaft, to maintain the second seal. When the torque converter clutch is closed, a torque path is formed from the cover to the output through the torque converter clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
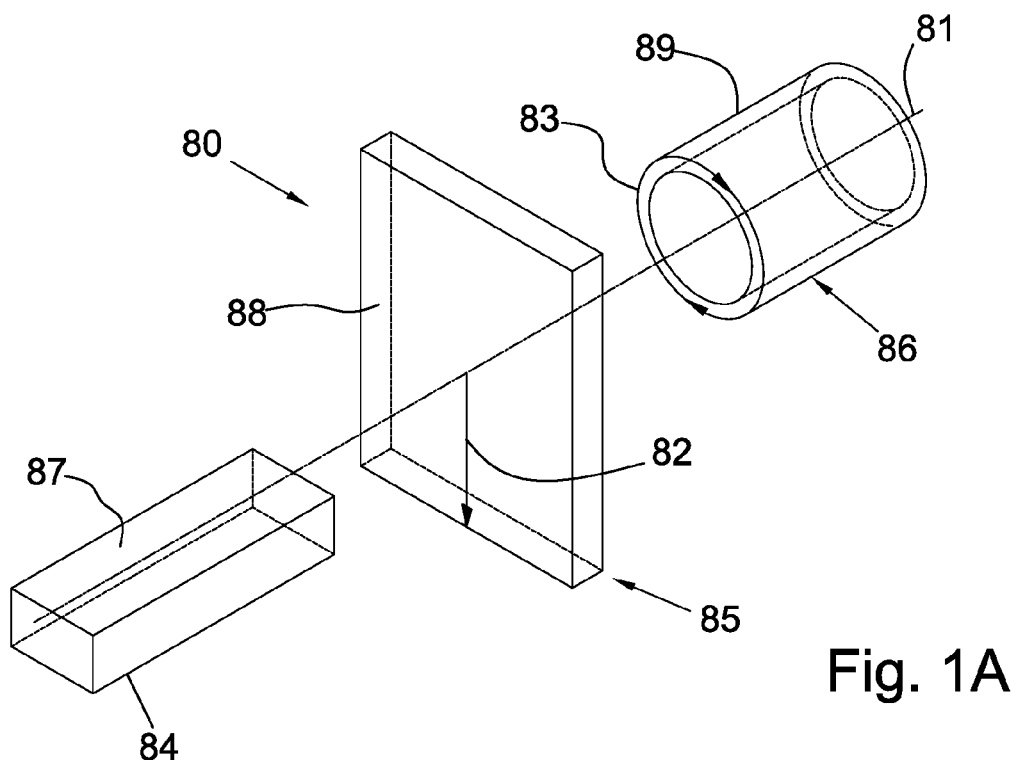
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
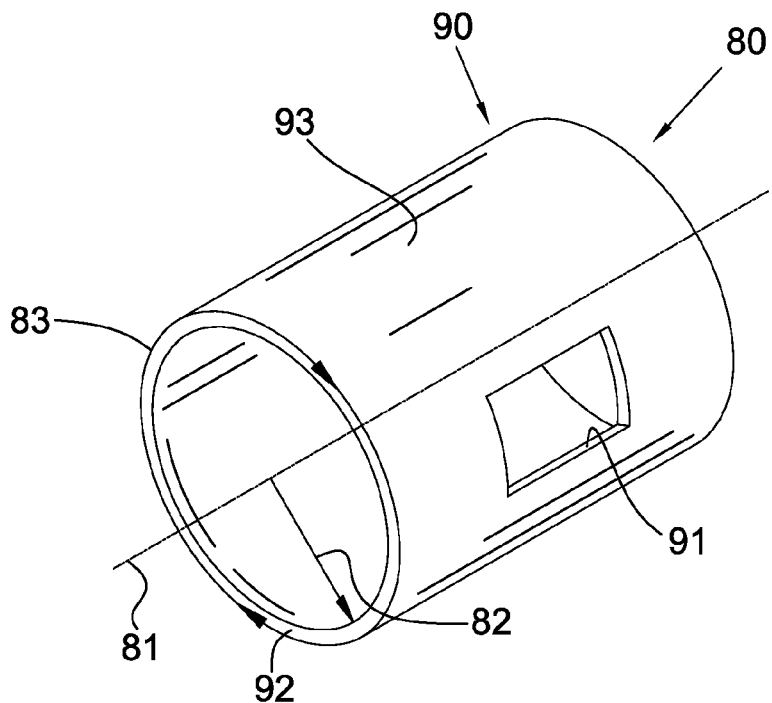
FIG. 1B is a perspective view of an object in the cylindrical coordinate system of FIG. 1A demonstrating spatial terminology used in the present application; and, FIG. 2 is a partial cross-sectional view of a torque converter with a bushing assembly.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
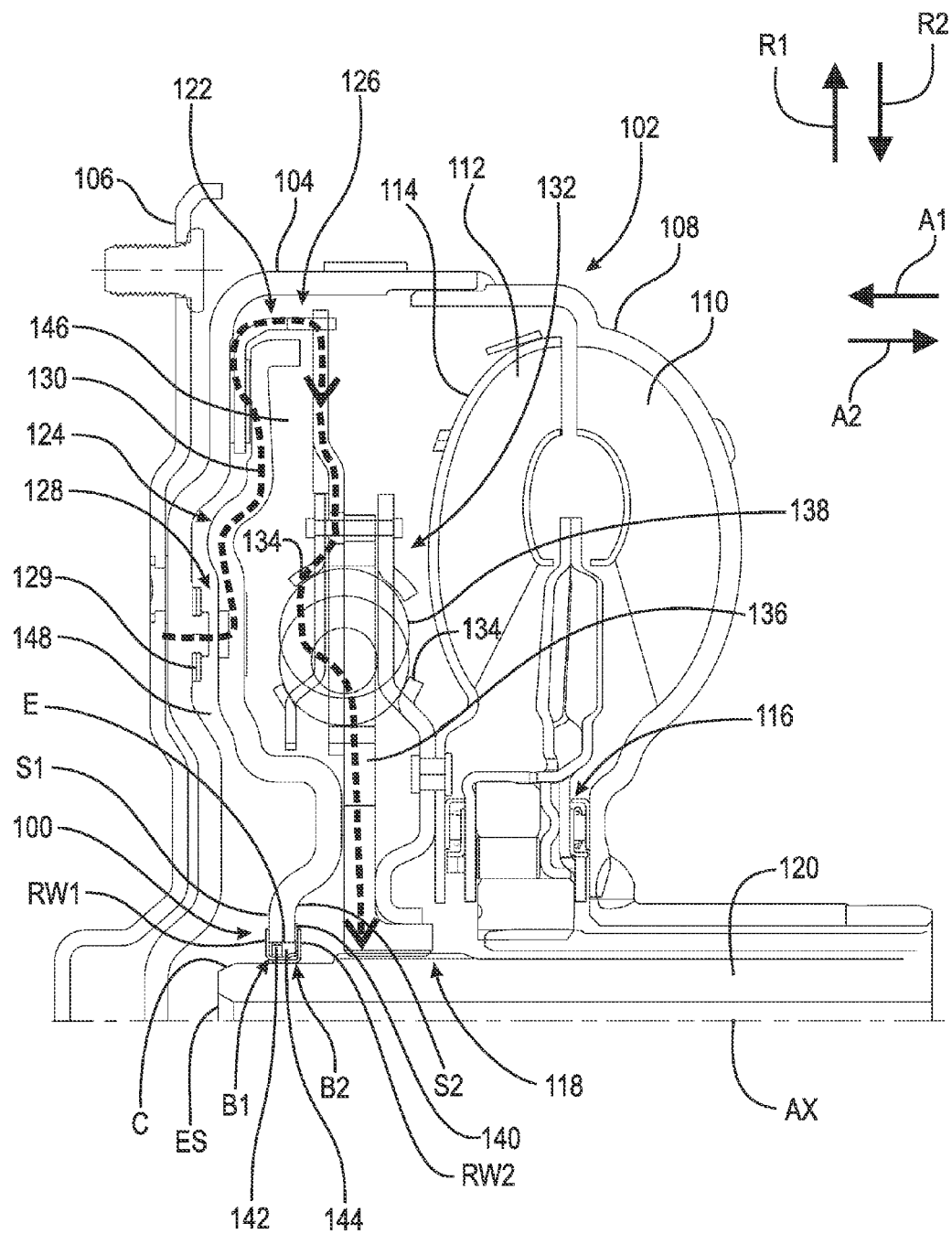

FIG. 2 is a partial cross-sectional view of a torque converter with a bushing assembly 100.

FIGS. 3A through 3F are details of bushing assembly 100. The following should be viewed in light of FIGS. 2 and 3. Torque converter 102 includes cover 104, arranged to receive torque, for example via flex plate 106, and pump shell 108, for pump 110, fixedly secured to the cover. By fixedly secured we mean that no relative motion is possible between the cover and the pump shell. The torque converter also includes turbine 112 hydraulically coupled to the pump, turbine shell 114, stator 116, and output 118 arranged to engaged transmission input shaft 120 to transmit torque from the torque converter to the input shaft. The torque converter also includes torque converter clutch 122 including axially displaceable piston 124, output 126, and input 128. In an example embodiment, input 128 is connected to the cover such that rotation of the input is locked to rotation of the cover, for example, piston 124 is connected to the cover by at least one leaf spring 129 which locks the rotation of the cover and the piston, but enables movement of the piston in axial directions A1 and A2. The piston is axially displaceable to close the clutch to create torque path 130 from the cover to output 126 or to open the clutch to disrupt the torque path. That is, when the clutch is closed, rotation of output 126 is locked to rotation of the cover.

In an example embodiment, the torque converter includes vibration damper 132. In an example embodiment, the damper includes cover plates 134 forming an input connected to output 126. The damper includes flange 136 forming output 118, and at least one spring 138 engaged with the cover plates and flange. In an example embodiment, shell 114 is fixedly connected to the cover plates. It should be understood that damper 132 is not limited to the configuration shown in FIG. 2.

The piston includes radial surfaces S1 and S2 and radially inner-most end E connecting the radial surfaces. The bushing assembly includes radial walls RW1 and RW2 and is arranged to engage the input shaft to form a seal against the input shaft. For example, contact of the bushing assembly with the input shaft prevents flow of fluid in the torque converter between the bushing assembly and the input shaft. In an example embodiment, S1 is disposed parallel to RW1 and arranged to form a second seal against RW1. For example, contact of S1 with RW1 prevents flow of fluid in the torque converter between S1 and RW1. In an example embodiment, RW2 faces S2, for example, respective portions of RW2 and S2 are aligned in direction A1. The bushing assembly is radially displaceable, for example, in directions R1 and R2 orthogonal to axis of rotation AX for the torque converter, with respect to the piston while maintaining the seal between the bushing assembly and the input shaft and the seal between S1 and RW1. That is, when the bushing radially displaces with respect to the piston, the respective seals remain functional (prevent the respective flows noted above).

In an example embodiment, for example as shown in FIGS. 2 and 3A through 3D, the bushing assembly includes bushings B1 and B2 fixedly connected to each other in a liquid-tight manner. For example, bushings B1 and B2 may be formed from metal such as steel or aluminum and fixedly connected by a press-fit connection. One of bushings B1 or B2, for example, B2, is arranged to engage the input shaft. It should be understood that the configuration shown in the figures can be reversed such that B1 contacts the input shaft. In an example embodiment, for example as shown in FIGS. 2 and 3A through 3D, B1 includes RW1 and B2 includes RW2. In an example embodiment, RW2 contacts S2 to form the seal between the piston and the bushing assembly. T In an example embodiment, for example, as shown if FIGS. 2 and 3A through 3C, the bushing assembly includes resilient element 140 disposed between RW2 and S2. Element 140 urges RW2 in axial direction A2 away from S2 such that RW1 contacts S1 to form a seal with S1.

Figure 3A:
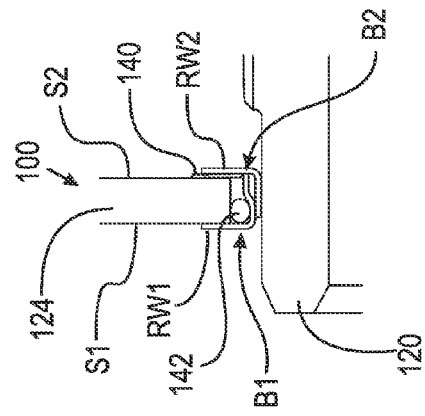
FIGS. 3A through 3F are details of a bushing assembly.
Figure 3B:
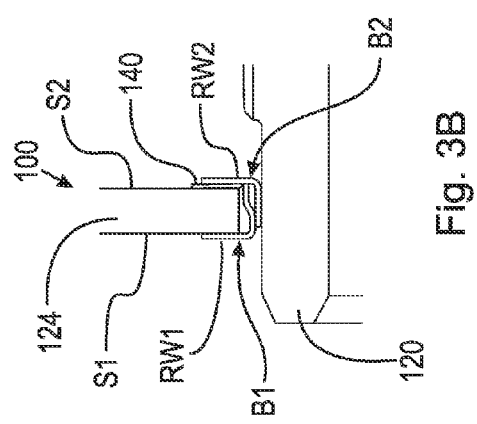
Figure 3C:
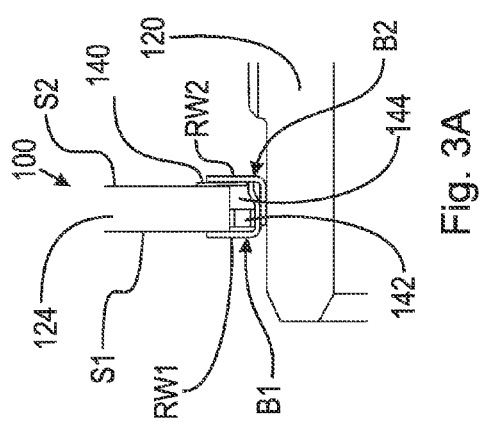

In an example embodiment, for example, as shown if FIGS. 2, 3A, and 3C, the bushing assembly includes resilient element 142 disposed in space 144 between the bushing assembly and end E of the piston. Element 142 urges the bushing assembly in a radial direction away from end E. For example, in FIG. 2, element 142 urges the bushing element in direction R2. Element 142 radially centers the bushing assembly with respect to the piston. This is advantageous when the components of the torque converter are assembled or "stacked." For example, element 142 ensures that the bushing assembly is axially aligned with chamfer C of the input shaft, rather than end surface ES of the input shaft, when the piston is installed on the input shaft, preventing possible damage to the bushing assembly. In an example embodiment, resilient element 142 is a wave spring (FIGS. 2 and 3A) or an O-ring (FIG. 3C).

Figure 3D:
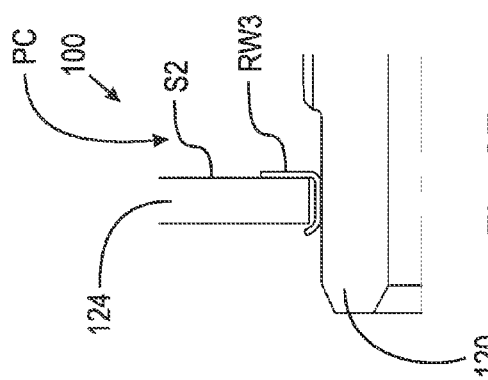

In an example embodiment, for example, as shown in FIG. 3D, RW1 and RW2 are in sufficient contact with S1 and S2, respectively, to form respective seals between the bushing assembly and the piston without the use of a resilient element such as element 140.

Figure 3E:
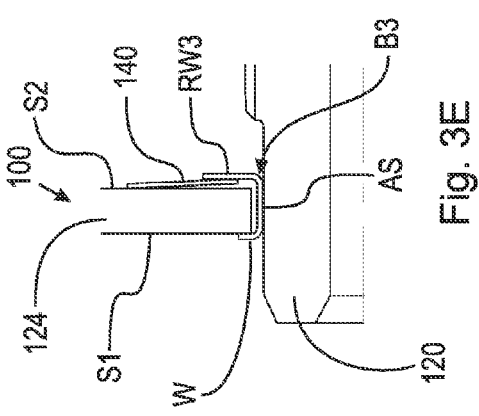
Figure 3F:
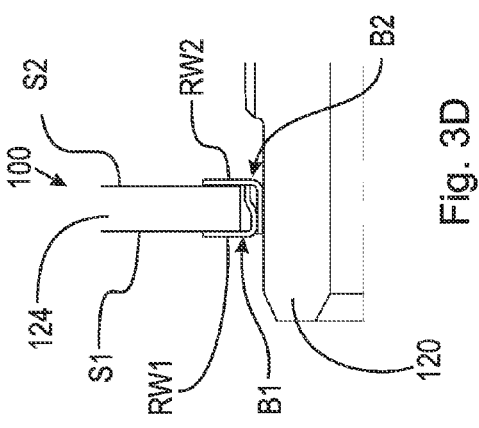
Figure 4:
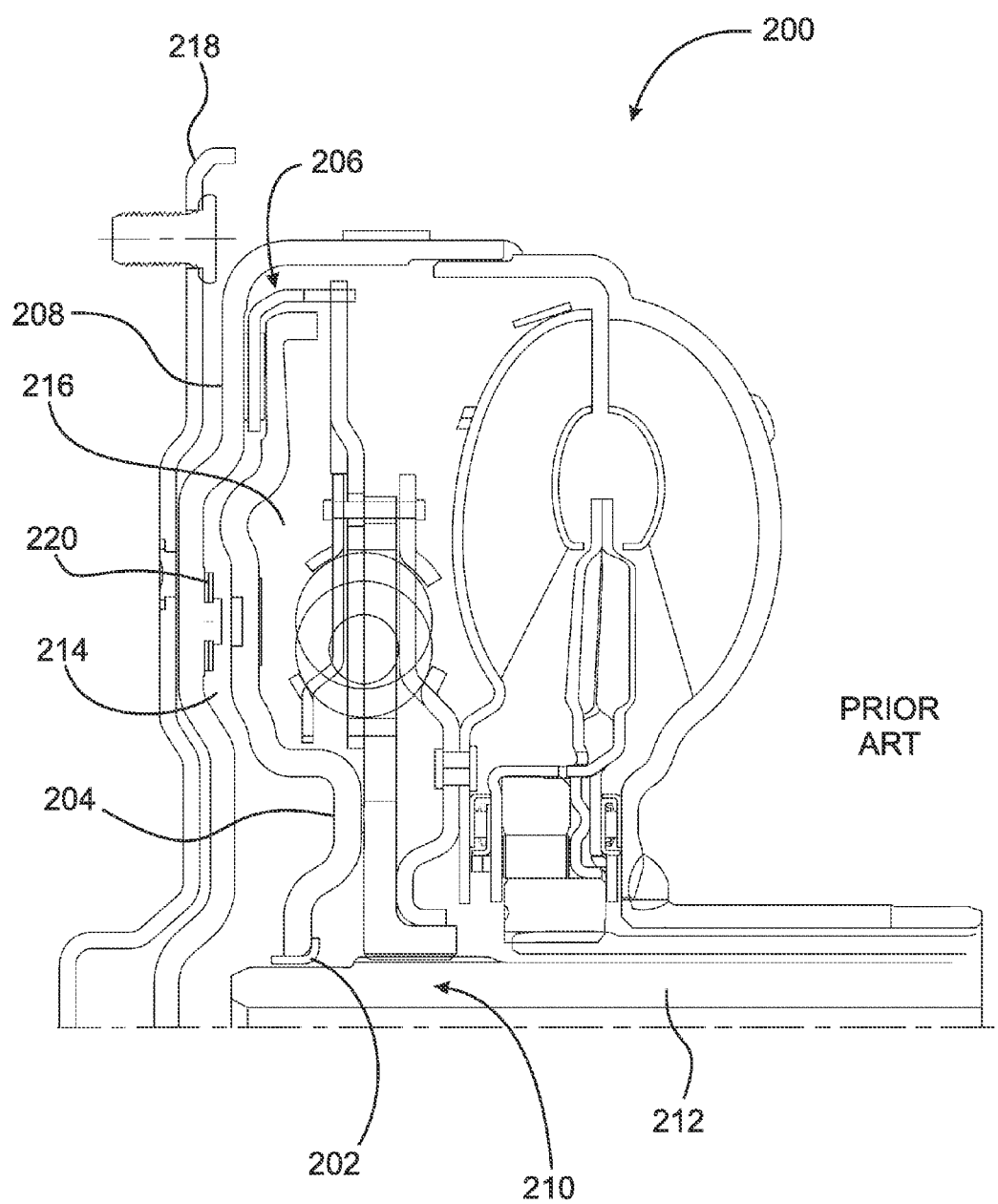
FIG. 4 is a partial cross-sectional view of a prior art torque converter with a bushing for a piston; and, FIG. 5 is a partial cross-sectional view of a prior art torque converter with a groove and seal for a piston.
Figure 5:
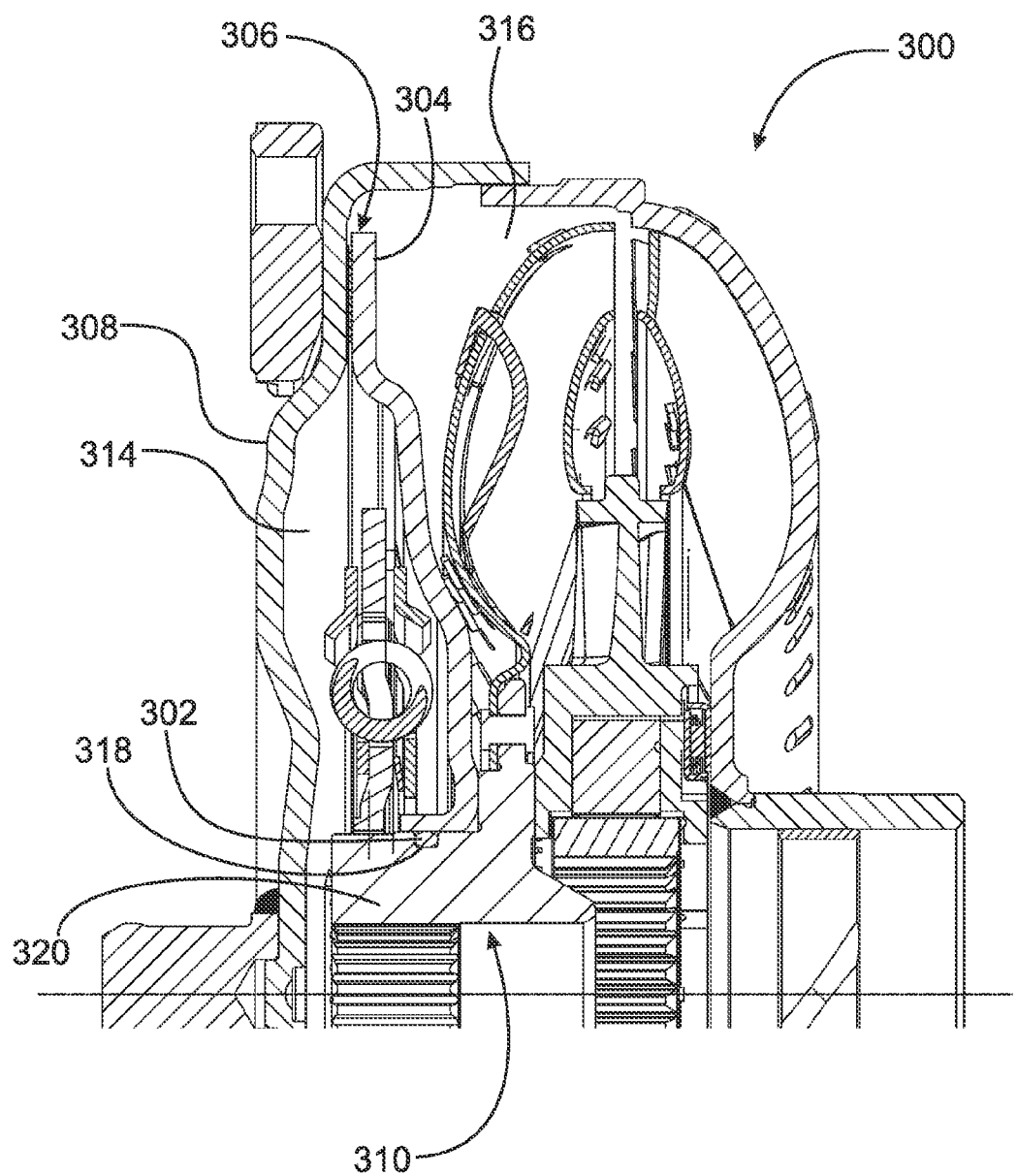

In an example embodiment, for example, as shown in FIGS. 3E and 3F, the bushing assembly includes single bushing B3 with radial wall RW3 parallel to S1, axial segment AS arranged to contact the input shaft, and wall W at least partially aligned with the piston in axial direction A2. RW3 or W is arranged to form a seal with S2 or S1 respectively. In an example embodiment, for example, as shown in FIG. 3E, the bushing assembly includes resilient element 140 disposed between the piston and RW3. The resilient element urges RW3 in direction A2 away from the piston such that W forms a seal with the piston, for example, with S1. In an example embodiment, for example, as shown in FIG. 3F, the piston and RW3 form a portion of pressure chamber PC for the torque converter and RW3 is arranged to displace toward the piston in direction A1 to form a seal against the piston in response to fluid pressure in the pressure chamber. For example, fluid pressure in the chamber, used to axially displace the piston pushes RW3 against S2 to seal RW3 against S2.

Advantageously, the bushing assembly provides a dynamic and adjusting seal between the piston and the input shaft solving the leakage problem noted above. For example, pressure in chambers 146 and 148 is used to control operation of clutch 122. Specifically, pressure in chamber 146 is increased to a level greater than the pressure in chamber 148 to displace the piston to close the clutch. The pressure differential between the chambers must be maintained to prevent slippage of the clutch. As noted above, leakage between the chambers via the interface of the piston with the input shaft can reduce the pressure in chamber 146.

Advantageously, bushing assembly 100 is radially adjustable to compensate for any misalignment of the piston and the input shaft. For example, assembly 100 forms a seal with respect to the piston, preventing leakage between the piston and the assembly, while maintaining the seal with the piston, during radial displacement of the assembly. Thus, the portion of the assembly in contact with the input shaft remains in contact with the input shaft as the relative positions of the assembly and the input shaft vary due to the misalignment of the piston and the input shaft. For example, when the clutch/piston is assembled on the input shaft, the assembly is able to radially displace along the piston as necessary such that the assembly seals against the entire circumference of the input shaft regardless of any misalignment of the input shaft with respect to the assembly. During operation of the torque converter, the assembly maintains contact with the input shaft and automatically adjusts radially with respect to the piston, maintaining both the seal with the piston and the seal with the input shaft.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A piston assembly, comprising:
   a piston for a clutch in a torque converter including:
      first and second radial surfaces; and,
      a radially inner-most end connecting the first and second radial surfaces; and,
   a radially displaceable bushing assembly:
      arranged to engage an input shaft for a transmission and form a first seal against the input shaft;

including a first radial wall disposed parallel to the first radial surface and forming a second seal against the first radial surface; and, including a second radial wall facing the second radial surface, wherein the bushing assembly is radially displaceable with respect to the piston while maintaining the second seal between the first radial wall and the first radial surface and the first seal between the bushing assembly and the input shaft.

2. The piston assembly of claim 1, wherein:

the bushing assembly includes first and second bushings fixedly connected to each other in a liquid-tight manner;

one of the first or second bushings is arranged to engage the input shaft;

the first bushing includes the first radial wall; and, the second bushing includes a second radial wall in contact with the second radial surface.

3. The piston assembly of claim 1, wherein:

the bushing assembly includes first and second bushings fixedly connected to each other in a liquid-tight manner;

one of the first or second bushings is arranged to engage the input shaft;

the first bushing includes the first radial wall;

the second bushing includes the second wall in the form of a second radial wall;

the bushing assembly includes a first resilient element disposed between the second radial wall and the second radial surface; and, the first resilient element urges the second radial wall in an axial direction away from the second radial surface such that the first radial wall contacts the first radial surface to form a seal with the first radial surface.

4. The piston assembly of claim 3, wherein:

the bushing assembly includes a second resilient element in a space formed by the first and second bushings and the radially inner-most end of the piston; and, the second resilient element urges the bushing assembly in a radial direction away from the radially-inner most end of the piston.

5. The piston assembly of claim 1, wherein:

the bushing assembly includes a resilient element in a space formed by the bushing assembly and the radially inner-most end of the piston; and, a second resilient element urges the bushing assembly in a radial direction away from the radially-inner most end of the piston.

6. The piston assembly of claim 5, wherein the second resilient element radially centers the bushing assembly with respect to the piston.

7. The piston assembly of claim 1, wherein:

the bushing assembly includes only a single bushing; and, the single bushing includes the first radial wall, an axial segment arranged to contact the input shaft, and a first wall at least partially aligned with the piston in an axial direction.

8. The piston assembly of claim 7, wherein:

the bushing assembly includes a resilient element disposed between the piston and the first wall and urging the first wall in an axial direction away from the piston such that the first radial wall forms a seal with the piston; or, the piston and the first radial wall form a portion of a pressure chamber for the torque converter and the first radial wall is arranged to displace toward the piston to form a seal against the piston in response to fluid pressure in the pressure chamber.

9. The piston assembly of claim 1, wherein:

the bushing assembly is radially displaceable with respect to the piston to compensate for radial misalignment of the piston with respect to the input shaft; and, when the bushing assembly radially displaces to compensate for the radial misalignment of the piston with respect to the input shaft, the first seal remains functional and the bushing assembly is arranged to maintain contact with the input shaft, about the full circumference of the input shaft, to maintain the first seal.

10. A torque converter, comprising:

a piston including:

first and second radial surfaces; and, a radially inner-most end connecting the first and second radial surfaces; and, a radially displaceable bushing assembly:

arranged to engage an input shaft for a transmission and form a first seal against the input shaft;

including a first radial wall disposed parallel to the first radial surface and arranged to form a second seal against the first radial surface; and, including a second radial wall facing the second radial surface, wherein the bushing assembly is radially displaceable with respect to the piston while maintaining the second seal between the first radial wall and the first radial surface and the first seal between the bushing assembly and the input shaft.

11. The torque converter of claim 10, wherein:

the bushing assembly includes first and second bushings fixedly connected to each other in a liquid-tight manner;

one of the first or second bushings is arranged to engage the input shaft;

the first bushing includes the first radial wall; and, the second bushing includes a second radial wall in contact with the second radial surface.

12. The torque converter of claim 10, wherein:

the bushing assembly includes first and second bushings fixedly connected to each other in a liquid-tight manner;

one of the first or second bushings is arranged to engage the input shaft;

the first bushing includes the first radial wall;

the second bushing includes a second radial wall;

the bushing assembly includes a first resilient element disposed between the second radial wall and the second radial surface; and, the first resilient element urges the second radial wall in an axial direction away from the second radial surface such that the first radial wall contacts the first radial surface to form a seal with the first radial surface.

13. The torque converter of claim 12, wherein:

the bushing assembly includes a second resilient element in a space formed by the first and second bushings and the radially inner-most end of the piston; and, the second resilient element urges the bushing assembly in a radial direction away from the radially-inner most end of the piston.

14. The torque converter of claim 13, wherein the second resilient element radially centers the bushing assembly with respect to the piston.

15. The torque converter of claim 10, wherein:

the bushing assembly includes a resilient element in a space formed by the bushing assembly and the radially inner-most end of the piston; and, a second resilient element urges the bushing assembly in a radial direction away from the radially-inner most end of the piston.

16. The torque converter of claim 10, wherein:
the bushing assembly includes only a single bushing; and,
the single bushing includes the first radial wall, an axial segment arranged to contact the input shaft, and a first wall at least partially aligned with the piston in an axial direction.

17. The torque converter of claim 16, wherein:
the bushing assembly includes a resilient element disposed between the piston and the first wall and urging the first wall in an axial direction away from the piston such that the first radial wall forms a seal with the piston; or,
the piston and the first radial wall form a portion of a pressure chamber for the torque converter and the first radial wall is arranged to displace toward the piston to form a seal against the piston in response to fluid pressure in the pressure chamber.

18. The torque converter of claim 10, wherein:
the bushing assembly is radially displaceable with respect to the piston to compensate for radial misalignment of the piston with respect to the input shaft; and,
when the bushing assembly radially displaces to compensate for the radial misalignment of the piston with respect to the input shaft, the first seal remains functional and the bushing assembly is arranged to maintain contact with the input shaft, about the full circumference of the input shaft, to maintain the first seal.

19. A torque converter, comprising:
a cover arranged to receive torque;
an output arranged to transmit torque to an input shaft for a transmission; and,
a torque converter clutch including:
    an axially displaceable piston:
        arranged to open and close the torque converter clutch;
        with first and second radial surfaces; and,
        with a radially inner-most end connecting the first and second radial surfaces; and,
    a bushing assembly including:
        a first bushing with a first radial wall;
        a second bushing with a second radial wall; and,
        a resilient element disposed between the first radial wall and the first radial surface and urging the first radial wall in an axial direction away from the first radial surface such that the second radial wall contacts the second radial surface and forms a first seal against the second radial surface, wherein:
            the first and second bushings are fixedly connected to each other in a liquid-tight manner;
            one of the first or second bushings is arranged to contact the input shaft to form a second seal against the input shaft;
            when the bushing assembly radially displaces to compensate for the radial misalignment of the piston with respect to the input shaft, the first seal remains functional and the bushing assembly is arranged to maintain contact with the input shaft, about the full circumference of the input shaft, to maintain the second seal; and,
when the torque converter clutch is closed, a torque path is formed from the cover to the output through the torque converter clutch.

\* \* \* \* \*